United States Patent [19]
Scaramucci

[11] 3,743,242
[45] July 3, 1973

[54] APPARATUS FOR RETAINING IN ASSEMBLED CONDITION A VALVE FOR USE BETWEEN FLANGES

[76] Inventor: Domer Scaramucci, 3245 S. Hattie, Oklahoma City, Okla. 73129

[22] Filed: May 17, 1971

[21] Appl. No.: 144,096

[52] U.S. Cl............... 251/152, 137/454.2, 137/316, 251/315
[51] Int. Cl. .......................... F16k 5/06, F16k 51/00
[58] Field of Search..................... 251/148, 151, 152, 251/315; 137/454.2, 454.6, 316

[56] References Cited
UNITED STATES PATENTS
3,503,415 3/1970 DeAngelis et al. ............. 251/315 X
2,992,655 7/1961 Davis .............................. 137/454.2

*Primary Examiner*—William R. Cline
*Attorney*—Dunlap, Laney, Hessin & Dougherty

[57] ABSTRACT

An apparatus for retaining the two seating or retaining rings of a wafer-type valve in assembled position with the two retaining rings seated in the respective opposite ends of the valve body during handling and shipment of the valve. In one form, the apparatus comprises a clip member having an elongated medial portion with a tab formed on each opposite end thereof. One or more clip members releasably interconnect the respective peripheries of the retaining rings by means of the tabs which engage ribs formed thereon. Screw means is disclosed for securing each clip member to the valve body. A detent formed on each tab for engaging a mating depression formed in each rib is also disclosed. In another form, the apparatus comprises one or more threaded bolts each extending through a pair of lugs formed on the outer peripheries of the respective retaining rings and interconnecting the retaining rings by means of a nut threaded thereon.

13 Claims, 9 Drawing Figures

INVENTOR
DOMER SCARAMUCCI
BY
Dunlap, Laney, Hessin & Dougherty
ATTORNEYS

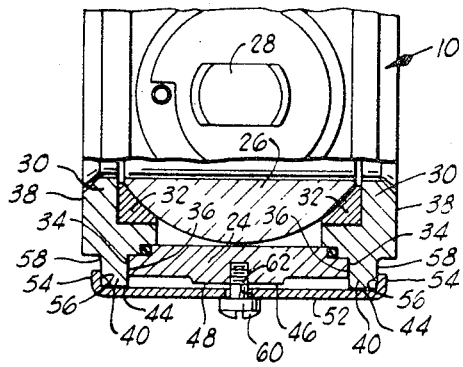
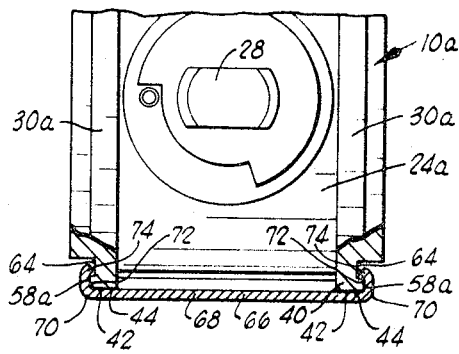
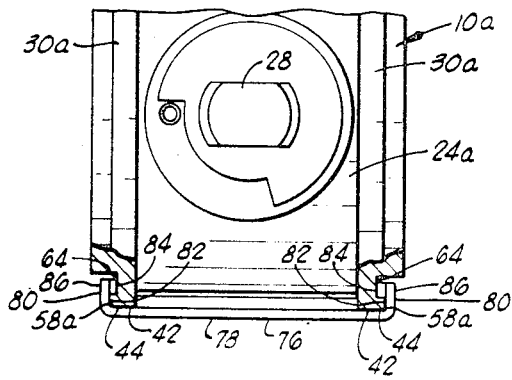
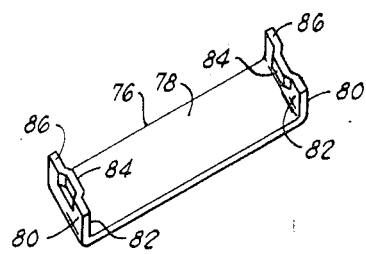
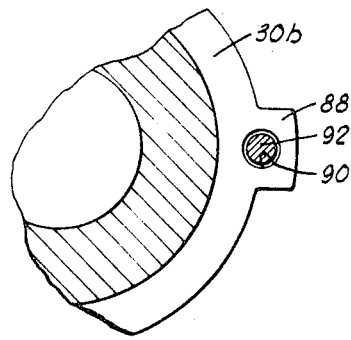

APPARATUS FOR RETAINING IN ASSEMBLED CONDITION A VALVE FOR USE BETWEEN FLANGES

BACKGROUND OF THE INVENTION

1. Field of the Invention

This invention relates generally to improvements in valves, and more particularly, but not by way of limitation, to an apparatus for retaining a wafer-type valve in assembled condition during handling and shipment.

2. Description of the Prior Art

It is now becoming popular for valve manufacturers to sell valves without flange or screw connections on the opposite ends thereof. Such valves are designed for use between standard pipe flanges and are commonly referred to as wafer-type valve. Wafer-type butterfly or disc valves have been in use for a number of years. A recent development in the valve art is the wafer-type ball valve.

Manufacturers of wafer-type valves have encountered problems in keeping the valves assembled during handling and shipping, particularly when the valve has seating rings in the opposite ends thereof which overlap the ends of the valve body. During handling and shipping, the seating rings tend to fall out and, when this occurs in a ball valve, having a "floating" ball, the ball can fall out of the valve body. The balls are susceptible to damage and should not be used if scarred or scored.

SUMMARY OF THE INVENTION

The present invention contemplates a novel apparatus for retaining, in assembled position, a valve of the type for use between a pair of tubular flanges having annular seating faces facing one another and mating bolt holes around the seating faces receiving connecting bolts. This type of valve includes a tubular body positioned concentrically between the flanges with an annular seating face formed on each end thereof, a valve member supported in the body for turning between open and closed positions, and a retaining ring having an outer peripheral portion, to be positioned between each end of the body and the respective flange. Each retaining ring has a seating face on the end thereof facing the respective flange of a size conforming to the seating face of the flange, and a seating face on the end thereof facing the body of a size conforming to the seating face of the respective end of the body. The apparatus for retaining the retaining rings in seating engagement with the respective ends of the body comprises a connecting member disposed on the outer peripheries of the retaining rings and releasably interconnecting the respective outer peripheral portions thereof.

An object of the present invention is to provide an apparatus for retaining a wafer-type valve in assembled position during handling and shipment, which apparatus is easily fabricated and installed.

Another object of the present invention is to provide an apparatus for retaining a wafer-type valve in assembled position during handling and shipment, which apparatus is easily removed and reinstalled to facilitate repair of the valve.

A further object of the present invention is to provide an apparatus for retaining a wafer-type valve in assembled position, which apparatus prevents the valve from becoming disassembled during handling and shipping whereby the valve closure member might be scarred or scored thus destroying the valve.

A still further object of the present invention is to provide an apparatus for retaining a valve for use between a pair of standard tubular flanges in assembled position, which apparatus is economical in construction and operation.

Other objects and advantages of the present invention will be evident from the following detailed description when read in conjunction with the accompanying drawings.

BRIEF DESCRIPTION OF THE DRAWINGS

FIG. 4 is a fragmentary, cross-sectional view taken substantially along the line 4—4 of FIG. 3, and showing the clip member installed on the valve.

FIG. 5 is a fragmentary, cross-sectional view similar to FIG. 4, illustrating another embodiment of the clip member installed on the valve.

FIG. 6 is a fragmentary, cross-sectional view similar to FIG. 4, and illustrating another embodiment of the clip member installed on the valve.

FIG. 7 is a perspective view of the clip member illustrated in FIG. 6.

FIG. 8 is a fragmentary cross-sectional view similar to FIG. 5 and illustrating another embodiment of the present invention.

FIG. 9 is a fragmentary cross-sectional view taken substantially along the line 9—9, of FIG. 8.

DESCRIPTION OF THE PREFERRED EMBODIMENTS

Figure 1:
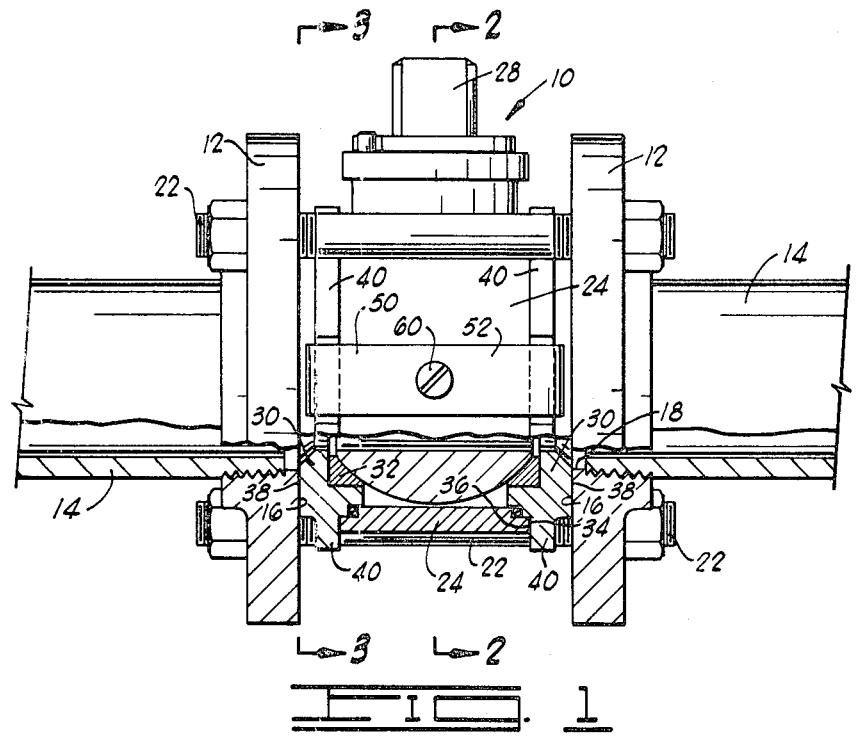
FIG. 1 is a side elevation view of a ball valve for use between tubular flanges, constructed in accordance with the present invention, with a portion thereof broken away and with portions shown in section.
Figures 2, 3:
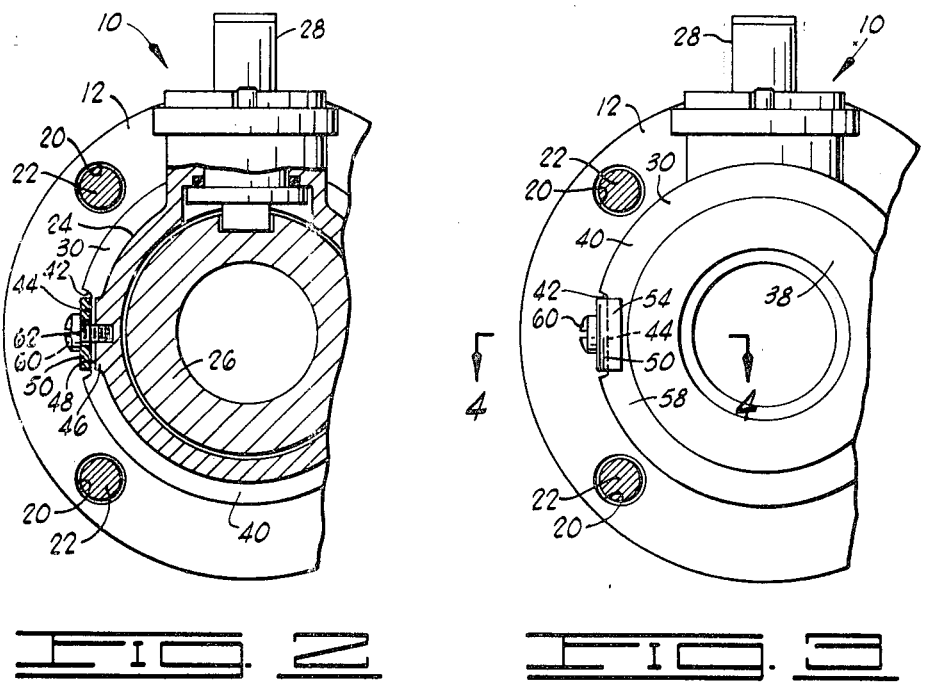
FIG. 2 is a fragmentary, cross-sectional view taken substantially along the line 2—2 of FIG. 1, and showing the clip member attached to the valve.
FIG. 3 is a fragmentary, cross-sectional view taken substantially along the line 3—3 of FIG. 1, showing the clip member in engagement with one retaining ring.

Referring now to the drawings, and to FIGS. 1, 2, 3 and 4 in particular, shown therein and generally designated by reference character 10 is a ball valve constructed in accordance with the present invention and adapted for use between a pair of flanges 12. The flanges 12 may be of standard ASA type or of some other type depending on the particular application. The flanges 12 are suitably secured to adjacent sections 14 of a flow line in which the valve is to be used. Each of the flanges 12 is provided with a seating face or area 16 encircling the bore 18 through the flange, as well as a plurality of circumferentially spaced bolt holes 20 around the seating face 16 to receive the usual interconnecting bolts 22.

The valve 10 comprises a tubular body or housing 24 in which a conventional valve ball 26 is carried. A conventional valve stem 28 is connected to the valve ball 26 and extends outwardly therefrom through the body 24. The connection between the ball 26 and stem 28 is a tongue and groove type, such that the ball is what is commonly known in the art as a "floating" ball. The body 24 is supported concentrically between the flanges 12 by means of a retaining ring 30 positioned between each end of the body 24 and the respective flange 12, and it will be observed that each retaining ring 30 carries a seal ring 32 of any desired composition in a position to sealingly engage the surface of the valve ball 26.

Each end of the body 24 is provided with a seating face 34 which matingly engages a seating face 36 formed on the respective retaining ring 30 adjacent thereto. A seating face 38 is formed on the outer end of each retaining ring 30 and matingly engages the seating face 16 formed on the flange 12 adjacent thereto.

A circumferential rib 40 is formed around the outer periphery of each retaining ring 30. One or more longitudinally matched pairs of notches 42 are formed in the respective ribs 40, each notch forming a flat seating surface 44 in the respective retaining ring 40. One or more bosses 46 are formed on the outer periphery of the valve body 24 at its medial portion. Each boss 46 is longitudinally aligned with a matched pair of notches 42. A flat seating surface 48 is formed on each boss 46 with the surface 48 lying in a plane substantially coincident with or slightly radially inward (with respect to the valve body 24) of the planes of the seating surfaces 44 of the respective pair of notches 42.

One or more elongated clip members or connecting members 50 are secured to the valve 10 to retain the retaining rings 30 and valve ball 26 in assembled position. Each clip member 50 is constructed of a solid resilient material, such as aluminum or steel. Each clip member 50 is preferably formed of a flat strip of aluminum or steel sheet, and comprises an elongated medial portion 52 and a tab 54 formed on each end thereof at right angles to the medial portion 52. Each clip member 50 is sized such that the inner surfaces 56 of the tabs 54 slidingly engage the outer radial surfaces 58 of the ribs 40 formed on the retaining rings 30.

Each clip member is positioned when the clip member is positioned in a pair of matching notches 42 and is seated on the respective seating surfaces 44 thereof. Each clip member 50 is retained in position by means of a screw 60 passed through a hole 62 formed in the medial portion 52 thereof and threaded into boss 46 adjacent thereto. When the screw 60 is tightened, the medial portion 52 of the clip member 50 is secured to the seating surface 48 of the boss 46 thereby retaining the clip member 50 in engagement with the retaining rings 30 and the valve body 24.

It should be noted that the spacing of the clip members 50 about the periphery of the valve 10 is such that the clip members will not interfere with the interconnecting bolts 22. It is readily apparent that when one or moreclip members 50 are secured in position, as described above, the retaining rings 30 are securely retained in assembled position engaging the respective seating faces 34 of the valve body 24, thereby retaining the valve ball 26 in proper position within the valve 10 even though the valve is not assembled between flanges. Therefore, the ball 26 will be prevented from falling out of the body during handling and shipment and the valve will be immediately ready for use upon receipt by the user.

The clip member 50 may be easily removed from the valve 10 for disassembly of the valve by simply removing the screw 60 from the body 24 and sliding the clip member 50 out of engagement with the retaining rings 30.

The number of clip members installed on a valve is essentially dependent upon the size and configuration of the valve with the smaller valves generally requiring fewer clip members. In the usual case, two clip members are preferred.

EMBODIMENT OF FIG. 5

FIG. 5 illustrates the application of another embodiment of the present invention as employed on a valve generally designated by reference character 10a. The valve 10a is identical to the valve 10 described above except for slight modifications to the body 24a and the retaining rings 30a. The modification to the body 24a consists of the removal of the bosses 46. The modification to the retaining rings 30a consists of the addition of a depression 64 formed on the outer radial surface 58a of each retaining ring 30a adjacent each notch 42 formed therein.

Each clip member 66 comprises an elongated medial portion 68 with a tab 70 formed on each end thereof at right angles thereto. The clip members 66 are preferably formed of the same materials described above. When installed, each clip member is positioned in a pair of matched notches 42 with the inner surfaces 72 of the tabs 70 slidingly engaging the respective outer radial surfaces 58a of the ribs 40 formed on the retaining rings 30a. When a clip member 66 is so positioned, the ends 74 of the tabs 70 are crimped or bent forming detents which engage the respective depressions 64 in the retaining rings 30a adjacent thereto, thereby securing the clip member 66 to the valve 10a by means of the self-biasing action of the clip member.

To disassemble the valve 10a, the clip members 66 may be pried off the valve by overcoming the self-biasing action of the clip members with a suitable tool such as a screwdriver, and upon reassembly of the valve 10a, new or used clip members 66 may be crimped in place, as described above, to retain the valve in assembled position.

EMBODIMENT OF FIGS. 6 and 7

FIG. 6 illustrates another embodiment of the present invention installed on the valve 10a, as described above. In this embodiment, a clip member 76 (See also FIG. 7), having a medial portion 78 and a tab 80 formed on each end thereof and at right angles thereto, is positioned in a pair of matched notches 42 and seated against the flat seating surfaces 44 formed thereon. The inner surfaces 82 of the tabs 80 slidingly engage the respective outer radial surfaces 58a of the retaining rings 30a. The clip member 76 is held in this position by means of a detent 84 formed on the inner surface 82 of each tab 80 adjacent the end 86 thereof. Each detent 84 engages the depression 64 formed in the retaining ring 30a adjacent thereto, thereby securing the clip member 76 to the valve 10a by means of the self-biasing action of the clip member.

The clip member 76 is preferably constructed of a resilient metallic material such as aluminum or steel, and may conveniently be fabricated from relatively thin sheets thereof. The clip member 76 may conveniently be prefabricated by means of a simple stamping procedure.

To disassemble the valve 10a, the clip members 76 may be pried therefrom by overcoming the self-biasing action of the clip members with a convenient tool such as a screwdriver. Upon reassembly of the valve 10a, the same clip members 76 which were previously removed therefrom may be reinstalled in the proper position by springing the detents 84 apart against the self-biasing action of the clip members and snapping the clip member 76 back into place. FIG. 7 illustrates one form of detent 84 which may be formed in the clip member 76, however, various other shapes of detents may conveniently be stamped or otherwise formed in the tabs 80 to engage the depressions 64 on the valve 10a.

EMBODIMENT OF FIGS. 8 and 9

FIGS. 8 and 9 illustrate the application of another embodiment of the present invention as employed on a valve generally designated by reference character 10b. The valve 10b is identical to the valve 10a described above except for slight modifications to the retaining rings 30b. The retaining rings 30b differ from the retaining rings 30a in that the retaining rings 30b have no circumferential ribs formed thereon nor any notches or depressions formed therein. One or more lugs 88 are formed around the outer periphery of each retaining ring 30b. Each lug 88 extends radially outwardly from the outer periphery of each retaining ring 30b and has a hole 90 formed therein in longitudinal alignment with the valve. The lugs 88 are spaced about the periphery of each retaining ring 30b so that they will not interfere with the bolts 22 interconnecting the flanges 12, previously described and shown in FIG. 1.

The retaining rings 30b are positioned in the respective ends of the valve body 24a such that the holes 90 in the lugs 88 are positioned in matched longitudinal alignment. A threaded bolt 92 is passed through the respective holes 90 of each matched pair of lugs 88. A threaded nut 94 is secured to the threaded end of each bolt 92 thereby securing the two retaining rings 30b in the respective ends of the valve body 24a. It is readily apparent that when the retaining rings 30b are securely retained in the assembled position as described above, the seating faces 36 thereof engage the respective seating faces 34 of the valve body 24a thereby retaining the valve ball 26 in proper position within the valve 10b even though the valve is not assembled between flanges. Therefore, the ball 26 will be prevented from falling out of the body 24a during handling and shipment and the valve will be immediately ready for use upon receipt by the user. It should also be noted that the length of the bolts 92 is less than the longitudinal distance between seating faces 38 of the retaining rings 30b facing the respective tubular flanges 12.

The bolts 92 may be easily removed from the valve 10b for disassembly of the valve by simply removing the threaded nuts 94 and sliding the bolts 92 out of the holes 90 formed in the lugs 88.

The number of bolts 92 installed on a valve is essentially dependent upon the size and configuration of the valve with the smaller valves generally requiring fewer bolts. In the usual case, two bolts are preferred.

It should be noted, that this embodiment of the present invention is preferably applied to wafer-type valves in the larger sizes as from 6 inches on up.

It should be noted that although the valve described above is of the ball type, the apparatus of the present invention is suitable for installation in other types of valves having similar exterior configurations, such as butterfly, disc or gate wafer-type valves which are designed for installation between tubular flanges, but is particularly useful on ball valves of the "floating" ball type.

From the foregoing, it will be readily apparent that the present invention provides a novel apparatus for retaining the wafer-type valve in assembled condition, which is easily fabricated and installed and affords protection to the valve during handling and shipping.

Changes may be made in the construction and arrangement of parts or elements as heretofore set forth in the specification and shown in the drawings without departing from the spirit and scope of the invention as defined in the following claims.

What is claimed is:

1. In a valve for use between a pair of tubular flanges having annular seating faces facing one another and mating bolt holes disposed around the seating faces receiving connecting bolts, said valve including:
   a tubular body adapted to be positioned concentrically between the flanges and having an annular seating face formed on each end thereof;
   a valve member supported in the body for movement between open and closed positions; and
   a retaining ring having an outer peripheral portion, to be positioned between each end of the body and each of the flanges, each retaining ring having a seating face on the end thereof facing the respective flange of a size conforming to the seating face of the flange and a seating face on the end thereof facing the body of a size conforming to the seating face of the respective end of the body;
an apparatus for retaining said retaining ring in seating engagement with the respective ends of said body, comprising:
   a connecting member disposed on the outer peripheries of the retaining rings and releasably interconnecting the respective outer peripheral portions thereof, said connecting member being positioned out of interference with the bolts interconnecting the tubular flanges when the valve is installed between the tubular flanges; and
   wherein said connecting member is secured in position interconnecting said retaining rings by a screw passing therethrough and threaded into said body.

2. The apparatus as defined in claim 1 wherein at least one additional connecting member is disposed on the outer peripheries of the retaining rings and releasably interconnects the respective outer peripheral portions thereof.

3. In a valve for use between a pair of tubular flanges having annular seating faces facing one another and mating bolt holes disposed around the seating faces receiving connecting bolts, said valve including:
   a tubular body adapted to be positioned concentrically between the flanges and having an annular seating face formed on each end thereof;
   a valve member supported in the body for movement between open and closed positions; and
   a retaining ring having an outer peripheral portion, to be positioned between each end of the body and each of the flanges, each retaining ring having a seating face on the end thereof facing the respective flange of a size conforming to the seating face of the flange and a seating face on the end thereof facing the body of a size conforming to the seating face of the respective end of the body;
an apparatus for retaining said retaining rings in seating engagement with the respective ends of the body, comprising:
   a circumferential rib formed on the outer peripheral portion of each retaining ring;

a connecting member disposed on the outer peripheries of the retaining rings and engaging said ribs formed thereon and releasably interconnecting the respective outer peripheral portions thereof, said connecting member being positioned out of interference with the bolts interconnecting the tubular flanges when the valve is installed between the tubular flanges;

a depression formed on each rib; and a detent formed on each end of said connecting member engaging a respective depression.

4. The apparatus as defined in claim 3 wherein said connecting member is self-biased into engagement with said ribs.

5. In a valve for use between a pair of tubular flanges having annular seating faces facing one another and mating bolt holes disposed around the seating faces receiving connecting bolts, said valve including:

a tubular body adapted to be positioned concentrically between the flanges and having an annualr seating face formed on each end thereof;

a valve member supported in the body for movement between open and closed positions; and a retaining ring having an outer peripheral portion, to be positioned between each end of the body and each of the flanges, each retaining ring having a seating face on the end thereof facing the respective flange of a size conforming to the seating face of the flange and a seating face on the end thereof facing the body of a size conforming to the seating face of the respective end of the body;

an apparatus for retaining said retaining rings in seating engagement with the respective end of said body, comprising:

a plurality of connecting members disposed on the outer peripheries of the retaining rings and releasably interconnecting the respective outer peripheral portions thereof, each connecting member being positioned out of interference with the bolts interconnecting the tubular flanges when the valve is installed between the tubular flanges, and each connecting member further including:

an elongated medial portion having opposite ends; and a tab on each end of said medial portion and extending therefrom to engage the outer peripheral portions of the respective retaining rings.

6. The apparatus as defined in claim 5 wherein each retaining ring is characterized further to include a circumferential rib formed on the outer pripheral portion thereof and each tab engages a respective rib.

7. The apparatus as defined in claim 6 wherein each connecting member is secured in position engaging said ribs by a screw passing therethrough and threaded into the body.

8. The apparatus as defined in claim 6 wherein said clip members are formed of resilient material.

9. The apparatus as defined in claim 8 characterized further to include:

a depression formed on each rib adjacent the respective tab; and a detent formed on each tab and seating in said respective depression.

10. In a valve for use between a pair of tubular flanges having annular seating faces facing one another and mating bolt holes disposed around the seating faces receiving connecting bolts, said valve including:

a tubular body adapted to be positioned concentrically between the flanges and having an annular seating face formed on each end thereof;

a valve member supported in the body for movement between open and closed positions; and a retaining ring having an outer peripheral portion, to be positioned between each end of the body and each of the flanges, each retaining ring having a seating face on the end thereof facing the respective flange of a size conforming to the seating face of the flange and a seating face on the end thereof facing the body of a size conforming to the seating face of the respective end of the body;

an apparatus for retaining said retaining rings in seating engagement with the respective ends of said body, comprising:

a lug formed on the outer peripheral portion of each retaining ring and extending radially outward therefrom;

a hole formed in each lug; and a connecting member disposed on the outer peripheries of the retaining rings and releasably interconnecting the respective outer peripheral portions thereof, said connecting member being positioned out of interference with the bolts interconnecting the tubular flanges when the valve is installed between the tubular flanges, said connecting member including:

a threaded bolt extending through said holes; and a nut threadedly secured to one end of said bolt interconnecting said lugs and securing said retaining rings in seating engagement with the respective ends of said body.

11. The apparatus as defined in claim 10 wherein said retaining rings are characterized further to include:

an additional lug formed on the outer peripheral portion of each retaining ring and extending radially outward therefrom;

a hole formed in each additional lug; and wherein an additional connecting member is disposed on the outer peripheries of the retaining rings, said additional connecting member being characterized further to include:

a threaded bolt extending through said holes formed in said additional lugs; and a nut threadedly secured to one end of said bolt interconnecting said additional lugs and securing said retaining rings in seating engagement with the respective ends of said body.

12. The apparatus as defined in claim 10 wherein said holes are in longitudinal alignment relative to said body.

13. The apparatus as defined in claim 12 wherein said bolt is sized such that the length thereof is less than the longitudinal distance between the seating faces of said retaining rings facing the respective tubular flanges.

* * * * *